United States Patent [19]

Curtius

[11] 4,304,049

[45] Dec. 8, 1981

[54] PROCESS FOR THERMAL TREATMENT, ESPECIALLY DRYING

[75] Inventor: Friedrich Curtius, Lindau, Fed. Rep. of Germany

[73] Assignee: Escher Wyss Limited, Zurich, Switzerland

[21] Appl. No.: 151,672

[22] Filed: May 20, 1980

[30] Foreign Application Priority Data

May 28, 1979 [CH] Switzerland .................... 4940/79
Oct. 27, 1979 [DE] Fed. Rep. of Germany ....... 2943528

[51] Int. Cl.³ .............................................. F26B 3/08
[52] U.S. Cl. ...................... 34/10; 34/57 A; 432/15; 165/104.16
[58] Field of Search ................... 34/57 R, 57 A, 10; 432/15, 58; 110/245, 224; 165/104 F

[56] References Cited

U.S. PATENT DOCUMENTS

| | | | |
|---|---|---|---|
| 3,585,732 | 6/1971 | Itahashi | 165/104 |
| 3,605,274 | 9/1971 | Nara | 34/57 A |
| 4,213,407 | 7/1980 | Headley | 110/224 |

Primary Examiner—Larry I. Schwartz
Attorney, Agent, or Firm—Robert A. Ostmann

[57] ABSTRACT

The invention relates to the thermal treatment of flowable material using heated contact surfaces in a fluidized bed. Known processes use a gas, often air, to fluidize the bed. This imposes limits on the temperatures that can be allowed to be reached as higher temperatures can cause the material to be treated to burn. It also often produces sterilization of the material. Further there is the problem of disposal of the gases generated in the treatment process. In an attempt to alleviate these problems, the present invention proposes a process generally of the above kind but in which the fluidizing gas comprises gases generated in the bed itself. This is economical as it reduces the heat losses, environmentally desirable as it reduces the amount of gas discharge and more efficient as these gases are generally inert, thus enabling higher temperatures to be generated in the bed without risk of the material burning, thus also facilitating sterilization of the material.

12 Claims, 1 Drawing Figure

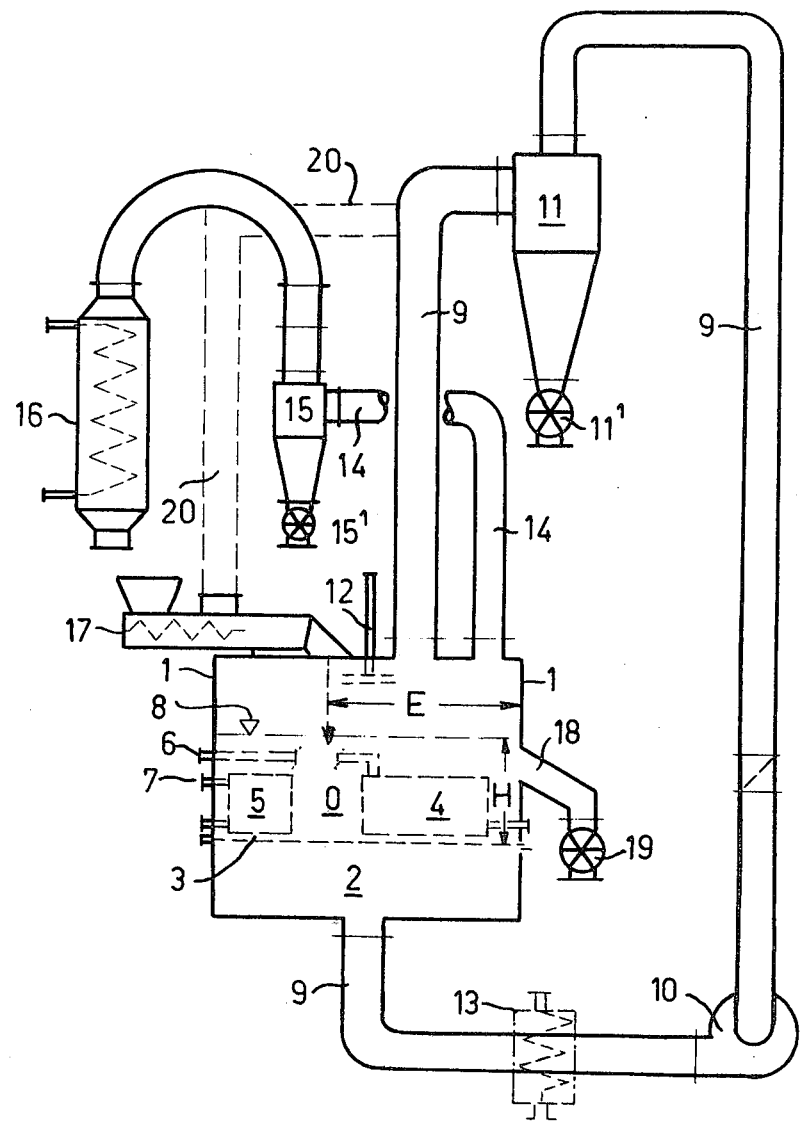

PROCESS FOR THERMAL TREATMENT, ESPECIALLY DRYING

BACKGROUND OF THE INVENTION

The invention relates to a process for thermally treating a flowable material in a fluidised bed. It has particular application to the drying or calcining of a granular, compacted or granulated substance using heated contact surfaces in a fluidised bed.

To such processes, the material to be treated comes into contact with heated contact surfaces, thus transmitting heat to the particles of material. The contact surfaces are incorporated in the layer of material which is to be treated. The introduction of gas causes movement of the layer in order to intensify the heat transfer. A known apparatus for carrying out such treatment is a fluidised bed contact drier, for example. It is known to use hot air for the gas treatment of the fluidised layer. However, this process imposes limits on the temperatures which can prevail in the layer. Temperatures in the fluidised bed which are above the burning point of the material which is to be treated should not be permitted, as the material would start to burn. This means that he temperatures are kept relatively low so as not to damage the product, with the result that the process to be carried out lasts longer than might be the case if higher temperatures were used.

In other cases, it can be desirable to use higher temperatures for the purpose of sterilizing of disinfecting the product by treating it at a correspondingly high temperature. This is the case, for example, with thermal treatment, particularly when drying sewage sludge, wherein the product has to be hygienically satisfactory so that it can be used, for example, in agriculture for improving the soil. In each of these processes, there is the problem of disposal of the gases discharged from the fluidised bed.

SUMMARY OF THE INVENTION

It is the aim of the present invention to increase the economic viability of such thermal treatment processes of, more particularly, drying processes, or to make it possible to use higher temperatures than were hitherto permissible in the fluidised bed, and thus obtain better quality products, e.g. sterilized. Another aim is to make these processes more acceptable, by ensuring that exhaust gases from the process do not pollute the environment. To these ends, the invention provides a process for thermally treating a flowable material in the form of a fluidised bed wherein heat is transmitted to the material using contact surfaces, and wherein the bed is fluidised by the recirculation of gases generated in the treatment. Not all the gases generated in the treatment need be recirculated; some may be separated and discharged, or used for other purposes as will be described.

Thus, in processes of the invention, normally, inert gases, e.g. mainly water vapour when drying sewage sludge, are used to fludise the bed, which will prevent the dried material from burning. Therefore it is possible to generate higher temperatures in the bed than hitherto. It is also possible to generate temperatures which ensure sterilization of the product again, for example, sewage sludge.

In preferred embodiments of the invention, it is recommended to use a fluidised bed contact apparatus wherein, during the treatment, the depth of the fluidised bed is such as to cover the heated contact surfaces, the gases being collected above the bed, and untreated material being fed to the surface of the bed.

BRIEF DESCRIPTION OF THE DRAWING

Other preferred features of the invention will be apparent from the following description of a preferred embodiment in which reference will be made to the accompanying drawing which diagrammatically shows apparatus for performing the process according to the invention.

DESCRIPTION OF THE PREFERRED EMBODIMENT

The apparatus shown is used for drying a liquid-containing material, e.g. sewage sludge, which has previously been mechanically dewatered and processed to form a granulate.

The apparatus comprises a sealed fluidised bed contact drier 1 which is provided with a gas distributor 2 below a perforated base 3. Above the base 3, there are provided contact surfaces 4 and 5 which are regulably connected to a heat source, e.g. a steam boiler, via ducts 6 and 7, respectively. In this case, condensate ducts for removing the condensate are provided on the other sides of the contact surfaces. The bed of the material which is to be treated is held at a height H with a surface 8 in the chamber in the drier formed by the contact surfaces. Thus the layer is heated by the contact surfaces, i.e. the heat which is introduced through the ducts 6 and 7 is transmitted via the contact surfaces 4 and 5 to the particles of material when they come into contact with the surfaces.

To improve the heat exchange, gas is passed through the bed of material, but only the inert gases formed during drying are used. These are collected above the bed after they leave the material and, uniformly distributed by the gas distributor, they are driven in a circuit through a duct 9 and through the base 3 to the bed. For this purpose, a blower 10 is provided in the duct 9 in the circuit. A cyclone or filter 11 with a sluice $11^1$ is used to remove the dust from the inert circulating gases. The gases are passed through the material in an amount and at a velocity such that the bed is fluidised. When the layer of material is in the fluidised state, very good heat exchange is obtained between the contact surfaces and the material.

The inert gases are essentially the steam of the liquid evaporated from the material to be dried during the drying process. The gases are automatically rendered inert during the circulation of the gases, as a result of the gradual uptake of vapours from the material, or else they can be rendered inert when the apparatus is started up, by spraying the contact surfaces by means of a spray 12.

Basically, all the heat which is to be supplied for vaporising the liquid which is to be vaporised is passed into the fluidised bed via the contact surfaces 4 and 5 incorporated in the bed. Obviously, the height of the bed is determined by the height of the chamber in the drier defined by the contact surfaces. In other words, the area of contact surface which is required for the transfer of the heat supplied must be incorporated.

If necessary, the circulating gases can be heated, for example, by means of a heat exchanger 13 connected to a heat source, so as to avoid condensation of the circulating gases in the bed, for example. In other cases, this heat exchanger could also be connected to the condensate duct of the contact surfaces.

The residual exhaust gases which are surplus to requirements for the gas treatment of the bed are removed from the fluidised bed contact drier along a path branching off the circuit, i.e. through the duct 14. A cyclone or a filter 15 with a sluice 15¹ for dusting the exhaust gases, or a condenser 16, for example, for recovering heat is provided in this path.

The fresh material to be dired is fed into the contact drier by means of a conveying apparatus 17. This may consist, for example, of a decanter with a screw conveyor. The material is fed in on to the surface 8 of the bed of material, at a distancee E from the site of the discharge 18 of the product. This is in the first half of the bed of material, viewed towards the discharge point for the product.

This feed point is situated at a space 0 in the bed of material which is kept free, i.e. which does not contain any contact surfaces. The contact surfaces are incorporated in the chamber in the bed in two systems 4 and 5 and a space 0 is kept free between them, The two systems may convey different amounts of heat. Thus, the bed may be at a different temperature in each of the systems. It is advantageous for the fresh material to be fed into this unoccupied space 0. There, it can be very intensively mixed with the dry materials present under the conditions of fluidisation. This space 0 "sucks" the heat out of the two chambers heated by the contact surfaces. This measure is a considerable help in maintaining the fluidised bed, as the moist fresh material is constantly mixed with a sufficient quantity of material which is already dry. However, the average moisture content of the layer must be kept low by regulating the supply of heat and/or fresh material into the layer. It then remains fluidisable and does not break down, since the circulating gases, i.e. the vapours, would condense if the moisture level of the layer were higher.

The geometric form of the bed of material is very important in order to keep this layer in the fluidised state. The layer is relatively high, owing to the height of the contact surfaces which have to be incorporated, as mentioned hereinbefore. It has also been found that for the same reason it is important that the ratio:

distance E/height H be within the range 0.1 to 5.0.

The fresh material to be treated may also be introduced to the fluidized bed at a plurality of locations which are so chosen that the ratio of the distance between any two locations to the height of the bed is in the range of 0.5 to 2.5.

The product discharge point 18, and hence the contact drier 1, is sealed off from the atmosphere by a sluice 19. Thus, a slight overpressure is maintained in the drier, to prevent air from being sucked in from the atmosphere. To prevent air from coming in with the fresh material via the conveying apparatus 17, the path for the exhaust gases which are to be removed from the drier may be directed at least partially counter to the stream of fresh material being fed in, so as to expel the air from the stream of fresh material with the opposing stream of exhaust gases. An exhaust gas duct suitable for this purpose is shown by broken lines in the drawing and is designated 20.

On the other hand, it may be advantageous to suck air into the drier, for example in the case of a malodorous material. This air can then, for example, be separated when the exhaust gases are condensed, and can be deodorised by burning, for example. In this case, a slight underpressure may be established in the drier.

The process described is not only useful for drying, as in the exemplary embodiment described, The same technique can also be used in other thermal processes, e.g. the calcining of sodium bicarbonate to form light soda by a corresponding thermal treatment.

The following example sets forth technical data of a process according to the invention.

Drying of clarified sludge:

Form of product: granulate prepared by recycling dry material by mixing with fresh slurry, particle size 0.1–8.0 mm.

Amount of dry material: 12,000 kg

Quantity of water: 3000 kg (corresponding to 20%)

Evaporation of water: 3000 kg

Dimensions of fluidised bed contact drier:

Flow-in base: length×width 2.5×2=5 m²

Contact surfaces:
  1st system (5) 30 m²
  2nd system (4) 60 m² total 90 m²

Height of bed (H): H=1.5 m

Lengths:
  contact surfaces 5: 0.75 m
  contact surfaces 4: 1.35 m
  Feed spaces between them (0): 0.4 m
  E=1.35+½(0.4)=E/H=1.55/1.5=1.033: 1.55 m Heating medium for contact surfaces: saturated steam at 30 bar/230° C.

Heating medium for heat exchanger (13) in circuit: saturated steam at 30 bar/230° C.

Amount of circulating gas: 14.000 kg/h
  at 170° C.: 28.600 m³/h

Speed gas flow: 1.6 m/sec

Starting up the apparatus (a) When spraying in water to exchange the volume of gas in the heated apparatus:
  quantity of water: approx.—150 liters (b) adding 5 m³ of dry granulate and heating the dry granulate to above 130° C., then supplying wet material.

Operating conditions

Input of product: 7.500 kg per 1 m of width of bed

Average exhaust gas temperature: 120° C. (above the layer)

Temperature in input zone (0): 103° C.

Final temperature of product: 125° C.

Temperature in the region of the systems of contact surfaces (4, 5): approx. 120° C.

Temperature of fluidising gases: 170° C.

Exhaust gas: 3000 kg/h at 120° C. out of the apparatus.

Possibility of heat recovery:

Condensation of 3.000 kg at 1 bar=approx. 1.618×10⁶ kcal/h. The dust portion from the cyclone 11 and 15 is recycled into the preparation of the granulate.

I claim:

1. A process for continuously thermally treating an at least partially waterlogged, moist material comprising the steps of feeding the material to the bed of a closed fluidized bed apparatus; heating the bed by means of heated contact surfaces, thereby producing inert gases containing mainly water vapor; fluidizing said bed exclusively by said inert gases, which are recirculated through the bed, the recirculated gases constituting only a portion of the gases produced in the apparatus, having essentially the same gas composition as when produced, and containing at the most a negligible amount of oxygen; and discharging the remainder of the inert gases produced in said apparatus.

2. A process as defined in claim 1 including the steps of maintaining a superatmospheric pressure in the fluidized bed apparatus; and directing at least a portion of said remainder of inert gases along a path through which said material is fed to the fluidized bed apparatus and in counterflow to said material, whereby entrained air in said material is removed and kept from mixing with the inert gases which are to be recirculated.

3. A process as defined in claim 1 wherein, prior to discharge, said remainder of the inert gases is subjected to at least one of the following treatments: recovery of heat by condensation, removal of entrained particles of said material, and deodorizing.

4. A process as defined in claim 1 including the step of filtering the recirculated inert gases to remove entrained particles of said material before the gases are reintroduced to the fluidized bed.

5. A process as defined in claim 1 including the step of adjusting the temperature of the recirculated inert gases before those gases are reintroduced to the fluidized bed.

6. A process as defined in claim 1 including the step of feeding fresh material to and withdrawing treated material from the fluidized bed at rates correlated to maintain a bed surface at least at the level of said heated contact surfaces, whereby those surfaces are located wholly within the fluidized bed.

7. A process as defined in claim 6 wherein the heated contact surfaces are divided into two systems spaced apart by a contact surface-free bed region; and the fresh material fed to the bed is introduced to said region, whereby different temperatures may be maintained in the spaced bed potions containing said systems of contact surfaces.

8. A process as defined in claim 1 including the step of maintaining the moisture level in the fluidized bed low enough to prevent condensation of vapors in the recirculated inert gases by at least one of the following measures: regulating the rates at which material is fed to and withdrawn from the fluidized bed, and controlling heating of the contact surfaces.

9. A process as defined in claim 1 wherein the fluidized bed has opposite ends, and which includes the steps of withdrawing treated material from one of said ends, and introducing fresh material to the bed at a location which is closer to the other of said ends than to said one end.

10. A process as defined in claim 1 wherein material is introduced to and withdrawn from the fluidized bed at locations spaced apart horizontally by a predetermined distance; and wherein the ratio of said distance to the height of the fluidized bed is in the range of 0.1 to 5.0.

11. A process as defined in claim 1 including the step of introducing said material to the fluidized bed at a plurality of locations so chosen that the ratio of the distance between any two locations to the height of the bed is in the range of 0.5 to 2.5.

12. A process as defined in claim 1 including the step of maintaining the temperature of the fluidized bed at a level which is above that required to vaporize liquid in the material and is sufficient to sterilize the material.

* * * * *